(12) United States Patent
Ehring

(10) Patent No.: US 12,352,685 B2
(45) Date of Patent: *Jul. 8, 2025

(54) APPARATUS AND METHOD FOR MEASURING THE LIGHT ABSORBANCE OF A SUBSTANCE IN A SOLUTION

(71) Applicant: Cytiva Sweden AB, Uppsala (SE)

(72) Inventor: Hanno Ehring, Uppsala (SE)

(73) Assignee: Cytiva Sweden AB, Uppsala (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/061,854

(22) Filed: Dec. 5, 2022

(65) Prior Publication Data

US 2023/0101434 A1 Mar. 30, 2023

Related U.S. Application Data

(63) Continuation of application No. 16/078,727, filed as application No. PCT/EP2017/054504 on Feb. 27, 2017, now Pat. No. 11,543,344.

(30) Foreign Application Priority Data

Feb. 26, 2016 (GB) .................................. 16033805

(51) Int. Cl.
 *G01N 21/03* (2006.01)
 *G01N 21/05* (2006.01)
 (Continued)

(52) U.S. Cl.
 CPC ......... *G01N 21/0303* (2013.01); *G01N 21/05* (2013.01); *G01N 21/33* (2013.01);
 (Continued)

(58) Field of Classification Search
 CPC .. G01N 21/25; G01N 21/0303; G01N 21/253; G01N 21/33; G01N 21/3151;
 (Continued)

(56) References Cited

U.S. PATENT DOCUMENTS

| 5,214,593 A | 5/1993 | Magnussen |
| 5,408,326 A | 4/1995 | Wang |

(Continued)

FOREIGN PATENT DOCUMENTS

| CN | 1979130 A | 6/2007 |
| DE | 4122925 A1 | 1/1993 |

(Continued)

OTHER PUBLICATIONS

PCT International Search Report and Written Opinion for PCT Application No. PCT/EP2017/054504 mailed May 10, 2017 (10 pages).

(Continued)

*Primary Examiner* — Hoa Q Pham
(74) *Attorney, Agent, or Firm* — Eversheds-Sutherland (US) LLP

(57) ABSTRACT

An apparatus for measuring the absorbance of a substance in a solution includes at least one sample cell arranged to contain the solution that is at least partially transparent to light of a predefined wavelength spectrum, at least two light passages through the at least one sample cell, each of the light passages having a known path length, an LED light source arrangement including at least two LEDs, each arranged to emit a light output with a wavelength within the predefined wavelength spectrum. A plurality of optical fibers, one for each light passage, is arranged at each LED for receiving the light output and guiding it to the light passages. A method for measuring the absorbance of a substance in a solution includes providing the LED light source arrangement with an associate fiber bundle for each LED.

17 Claims, 4 Drawing Sheets

Figure 1:
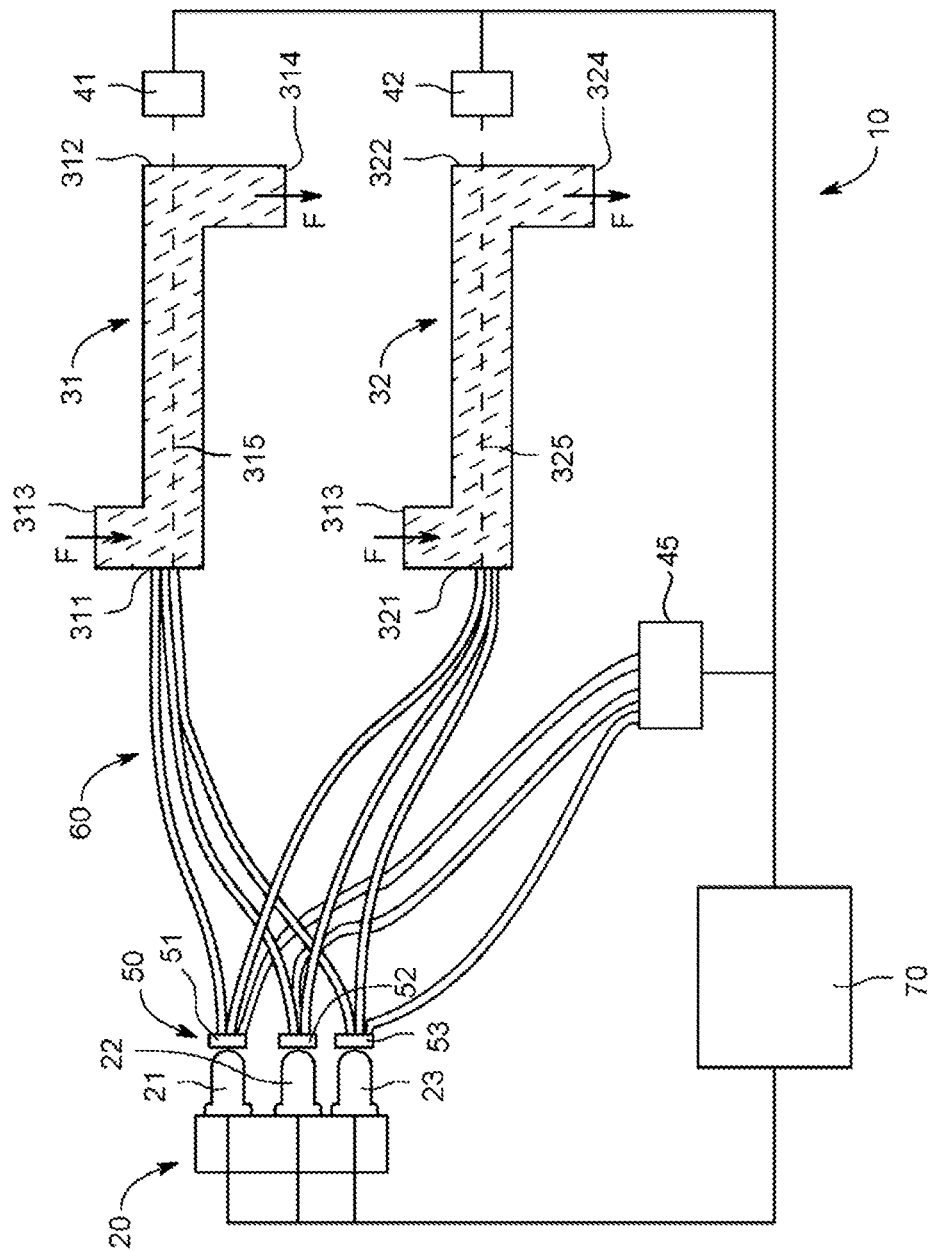

(51) Int. Cl.
 *G01N 21/33* (2006.01)
 *G01N 21/31* (2006.01)
(52) U.S. Cl.
 CPC ........ *G01N 2021/3133* (2013.01); *G01N 2201/0627* (2013.01); *G01N 2201/0668* (2013.01); *G01N 2201/0826* (2013.01)
(58) Field of Classification Search
 CPC ......... G01N 21/255; G01N 2201/0627; G01N 2201/0826
 USPC ......................................... 356/432–440, 246
 See application file for complete search history.

(56) References Cited

U.S. PATENT DOCUMENTS

| | | |
|---|---|---|
| 6,342,948 B1 | 1/2002 | Gilby |
| 7,122,799 B2 | 10/2006 | Hsieh |
| 7,570,360 B1 | 8/2009 | Tkachuk |
| 7,847,944 B2 | 12/2010 | Buettner |
| 8,649,005 B2 | 2/2014 | Tornod |
| 8,908,184 B2 | 12/2014 | Bernhard et al. |
| 9,322,772 B2 | 4/2016 | Ehring |
| 11,543,344 B2* | 1/2023 | Ehring .................. G01N 21/33 |
| 2004/0239944 A1 | 12/2004 | Shirai |
| 2009/0068747 A1 | 3/2009 | Iten |
| 2011/0188042 A1 | 8/2011 | Belz |
| 2015/0153272 A1 | 6/2015 | Ehring |

FOREIGN PATENT DOCUMENTS

| | | |
|---|---|---|
| EP | 2767821 A1 | 8/2014 |
| JP | 58193438 A | 11/1983 |
| JP | 07012726 A | 1/1995 |
| JP | 2015137983 A | 7/2015 |
| WO | 2013/178770 A1 | 12/2013 |

OTHER PUBLICATIONS

GB Search Report for GB Application No. 1603380.5 mailed Jun. 16, 2016 (3 pages).
Li et al., "Detection of Hg2+ in Water Environment by Fluorescence Spectroscopic Methods," Proc of SPIE, 2015, 9623:96230V-1t to 96230V-6.
Japanese Office Action for JP Application No. 2018-544452, mailed Nov. 2, 2020 (10 pages in English).

* cited by examiner

APPARATUS AND METHOD FOR MEASURING THE LIGHT ABSORBANCE OF A SUBSTANCE IN A SOLUTION

CROSS REFERENCE TO RELATED APPLICATIONS

This application is a continuation of U.S. application Ser. No. 16/078,727, filed on Aug. 22, 2018, which claims the priority benefit of PCT/EP2017/054504 filed on Feb. 27, 2017, which claims the priority benefit of Great Britain Application No. 1603380.5 filed Feb. 26, 2016. The entire contents of which are incorporated herein by reference.

TECHNICAL FIELD

The present invention relates to an apparatus and method for measuring the absorbance of a substance in a solution, typically a substance exhibiting UV light absorption at a wavelength of 400 nm or less.

BACKGROUND

Many substances absorb ultra violet or visible light due to their chemical composition. The absorption of light by substances has been used as the basis for detecting the presence of, and measuring the concentration of, such substances for many years. The concentration of the substance can be determined by use of the Beer Lambert Law:

$$A = Ebc$$

where:
A is light absorbance;
E is the molar light absorptivity with units of L mol$^{-1}$ cm$^{-1}$;
b is the light path length of the sample defined in cm; and
c is the concentration of the compound in solution, expressed in mol$^{-1}$.

The UV region can be considered to consist of light of wavelength in the region of 1 nm to 400 nm, light of wavelength of 180 nm to 300 nm being known as 'deep UV'.

Most analytical instruments for detecting substances which absorb in the deep ultra violet (UV) region use a mercury-lamp, deuterium lamp or xenon flash lamp as a light source. One example of such an instrument is a flow cell in which a solution containing one or more UV absorbing substances is passed between a UV light source (e.g. a mercury-lamp) and a UV detector (e.g. a photomultiplier or a photodiode) and changes in the intensity of UV light reaching the detector are related to the concentration of UV absorbing substances in the solution.

The detection of proteins, nucleic acids and peptides are of great importance in many sectors, including the environmental, biological and chemical sciences. Proteins have mainly two absorption peaks in the deep UV region, one very strong absorption band with a maximum at about 190 nm, where peptide bonds absorb, and another less intense peak at about 280 nm due to light absorption by aromatic amino acids (e.g. tyrosine, tryptophan and phenylalanine).

Nucleic acids absorb UV light at around 260 nm, some of the subunits of nucleic acids (purines) having an absorbance maximum slightly below 260 nm while others (pyrimidines) have a maximum slightly above 260 nm. Almost all proteins have a maximum absorbance at about 280 nm due to the content of the light absorbing aromatic amino acids. The light source in the detectors of analytical systems used to detect and measure protein concentrations has historically been the mercury-line lamp. Mercury produces light with a wavelength of 254 nm but not at 280 nm, so a fluorescence converter is needed to transform the 254 nm light produced by the mercury lamp to longer wavelengths and a band pass filter is used to cut out a region around 280 nm. Mercury lamps have relatively short lifetimes and can prove unstable with time; furthermore, the disposal of these lamps can lead to environmental problems. The other lamps used to generate ultra violet light, such as the deuterium and the xenon flash lamps, disadvantageously require high voltages, need complicated electronics and often prove unstable with time. All of the currently used ultra violet light sources are relatively large and are consequently unsuitable for miniaturisation of analytical instruments.

Moreover, all of the lamps generate significant amounts of heat due to the high voltages required for their operation.

Recently light emitting diodes (LED) of type AlGaN/GaN with emissions in the 250 nm to 365 nm range have been developed. Sensor Electronic Technology, Inc. (Columbia, S.C., USA) have pioneered the development and use of these UV light 5 emitting diodes, particularly for irradiating and sterilising fluids such as biologically contaminated water (e.g. US 2005/0093485). Other groups have also employed UV light emitting diodes for water purification systems (e.g. Phillips Electronics, WO2005/031881).

Light emitting diodes (LEDs), which emit in the visible region of the spectrum, have been used for indirect photometric detection (Johns c., et al. (2004) Electrophoresis, 25, 3145-3152) and fluorescence detection of substances in capillary electrophoresis (Tsai C., et al. (2003) Electrophoresis, 24, 3083-3088). King et al. (Analyst (2002) 127, 1564-1567) have also reported the use of UV light-emitting diodes which emit at 379.5 15 nm for indirect photometric detection of inorganic anions. The use of deep UV light emitting diodes as light sources in detection systems for nucleic acids is disclosed in US2005/0133724. However, although detection systems employing LEDs are disclosed, there are no experimental data to indicate that the proposed systems were indeed successfully employed to measure nucleic acid levels in polymerase chain reaction assay. The system described would lack sensitivity, linearity, and dynamic range because there is no use of a band pass filter or a beam splitter and reference detector; LEDs are very sensitive to minute changes in temperature, changes of the order of one hundredth of a degree Centigrade causing a drift in the baseline. Furthermore, the system lacks a band pass filter which acts to both narrow the bandwidth and block light in the visible region of the spectrum. A narrow bandwidth compared to the natural bandwidth of the sample, preferable a ratio of 1 to 10, provides a good linearity of the response and a broad dynamic range. (Practical Absorbance Spectrometry. Ed. A Knowles and C. Burgess, Chapman and Hall, New York).

JP2002005826 discloses a system for measuring ozone concentration. However, no experimental data that show the linearity and dynamic range are provided. The system uses a solid state emitter, which is composed of a diamond semiconductor thin film, to emit ultraviolet light with an emission peak of wavelength 240 to 270 nm. The emission spectrum at half value width of the UV peak is somewhat narrower than the half value width of the peak of the absorption spectrum of ozone (emission maximum approximately 254 nm). However, while this may be sufficient to measure ozone concentrations, the lack of a band pass filter which can reduce the band width to, for example, one tenth of the half value width of the ozone absorption peak will significantly reduce the linearity and dynamic range of the detector (Practical Absorbance Spectrometry. Ed. A Knowles and C. Burgess, Chapman and Hall, New York). This system also lacks a reference photo detector, so no measurement of the intensity of the emitted light is made. This means that compensation of variations of the emitted intensity due to changes in temperature is not possible.

WO2007/062800 (incorporated herein by reference), describes the use of a UV LED as a source of light for analysis of the concentration of a substance in a liquid sample, but it has been found that a broader spectrum of light is desirable in order to subject the sample to different wavelengths and thereby define a substance more accurately or more quickly, by its absorption characteristics at different wavelengths. However, known LEDs have only a limited light wavelength output range.

WO2013/178770 discloses a system and method for measuring the absorbance of a substance in a solution, using a plurality of LEDs with wavelength within the UV spectrum to overcome the problems described above. It would however be advantageous to develop the technology further, especially with regard to cost efficiency and to create a more compact apparatus. The present invention addresses these problems to further improve known methods and apparatuses within the field.

SUMMARY OF THE INVENTION

It will be understood that the term 'substance', as used herein, refers to any chemical entity. In particular, it includes organic compounds and inorganic compounds. Examples of organic compounds include, but are not limited to, proteins, peptides, carbohydrates, lipids, nucleic acids, protein nucleic acids, drug candidates and xenobiotics. Examples of inorganic compounds include metal salts (e.g. ferric sulphate, 30 copper chloride, nickel nitrate).

The object of the present invention is to eliminate or at least to minimize the problems described above. This is achieved through an apparatus and method according to the appended independent claims.

Thanks to the invention, the transmission of light from each of the LEDs to the light passages can be made more compact with fewer components than previously known, resulting in a more efficient and cost effective apparatus. By arranging an associated optical fiber bundle, the bundle comprising a plurality of optical fibers, the light output from each LED can be received by the bundle that provides a light guide from that respective LED to each of the light passages in the flow cell or flow cells without the need for additional components such as beam splitters and additional fiber bundles that have previously been required.

According to an aspect of the invention, a controller is provided to control the light output from the light source arrangement. The controller can select one of the LEDs to give the light output so that the light from only one of the LEDs reaches the light passages, but can alternatively also control the LEDs to each emit the light output at different frequencies so that light from every LED reaches each light passage but generally not simultaneously.

The light passages may be arranged in the same flow cell but having different path lengths so that substances of different absorbance may be used with the invention. Alternatively, the light passages can be arranged in different flow cells each connected to the optical fibers of the apparatus.

The light output from the LEDs can be filtered to allow only one wavelength or a very narrow wavelength band of light to reach the light passages. The filter can be arranged between the LED and the optical fibers, but can alternatively also be arranged between the optical fiber and the light passage or between the light passage and the detector. In the latter cases, one optical filter for each light passage and each LED will be required, for instance arranged on a filter wheel or similar structure to allow for a removal and insertion of a specific filter when the corresponding LED is active. Another possibility is to provide a filter that allows light of wavelengths corresponding to more than one of the LEDs, so that only one filter before or after each light passage is needed.

In one embodiment of the invention, the LEDs and optionally also the optical filter arranged in connection with the LED may be replaceable so that a user can select which wavelengths of light to use with the invention.

Further advantages and benefits of the invention will become readily apparent in view of the detailed description below.

DRAWINGS

Figure 2:
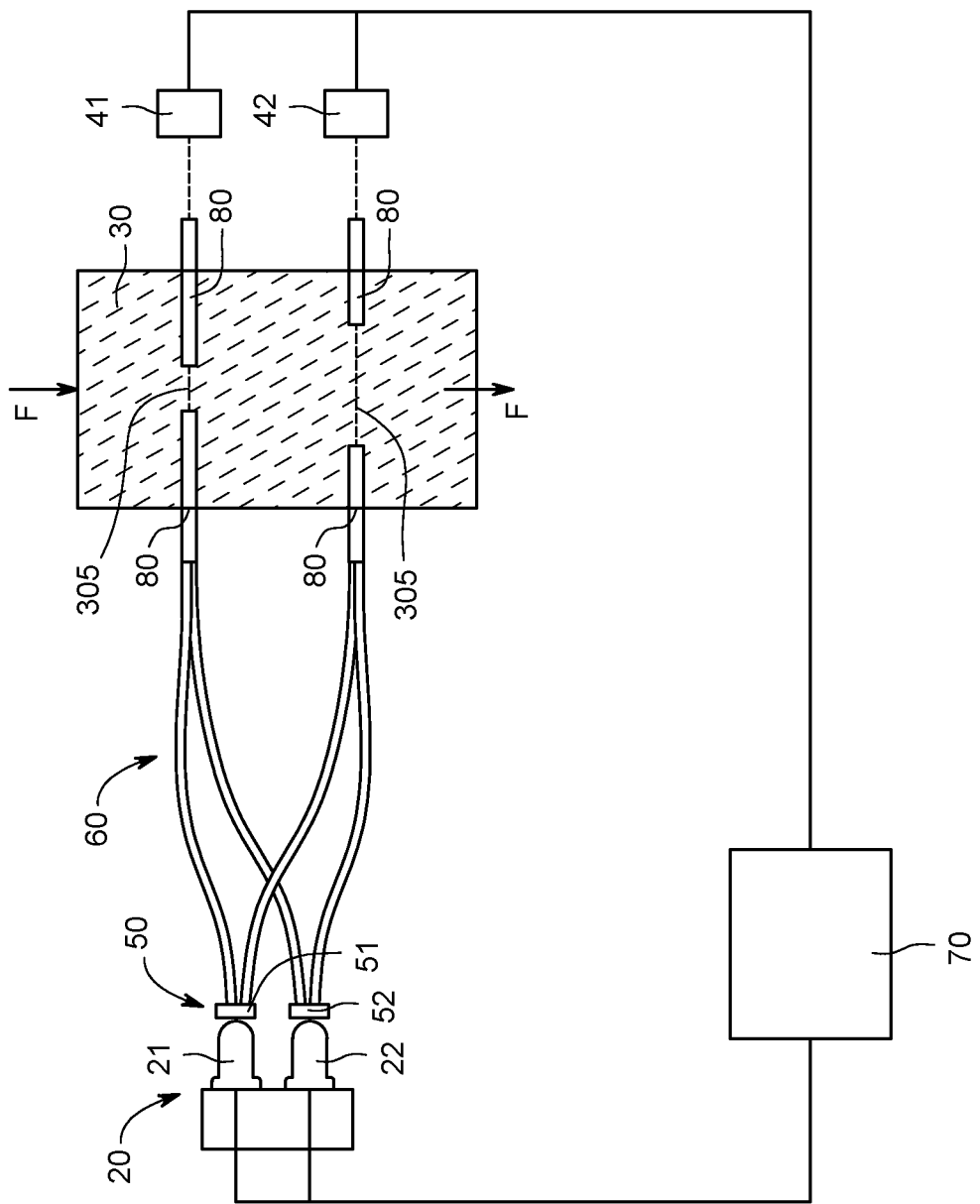
Figure 3:
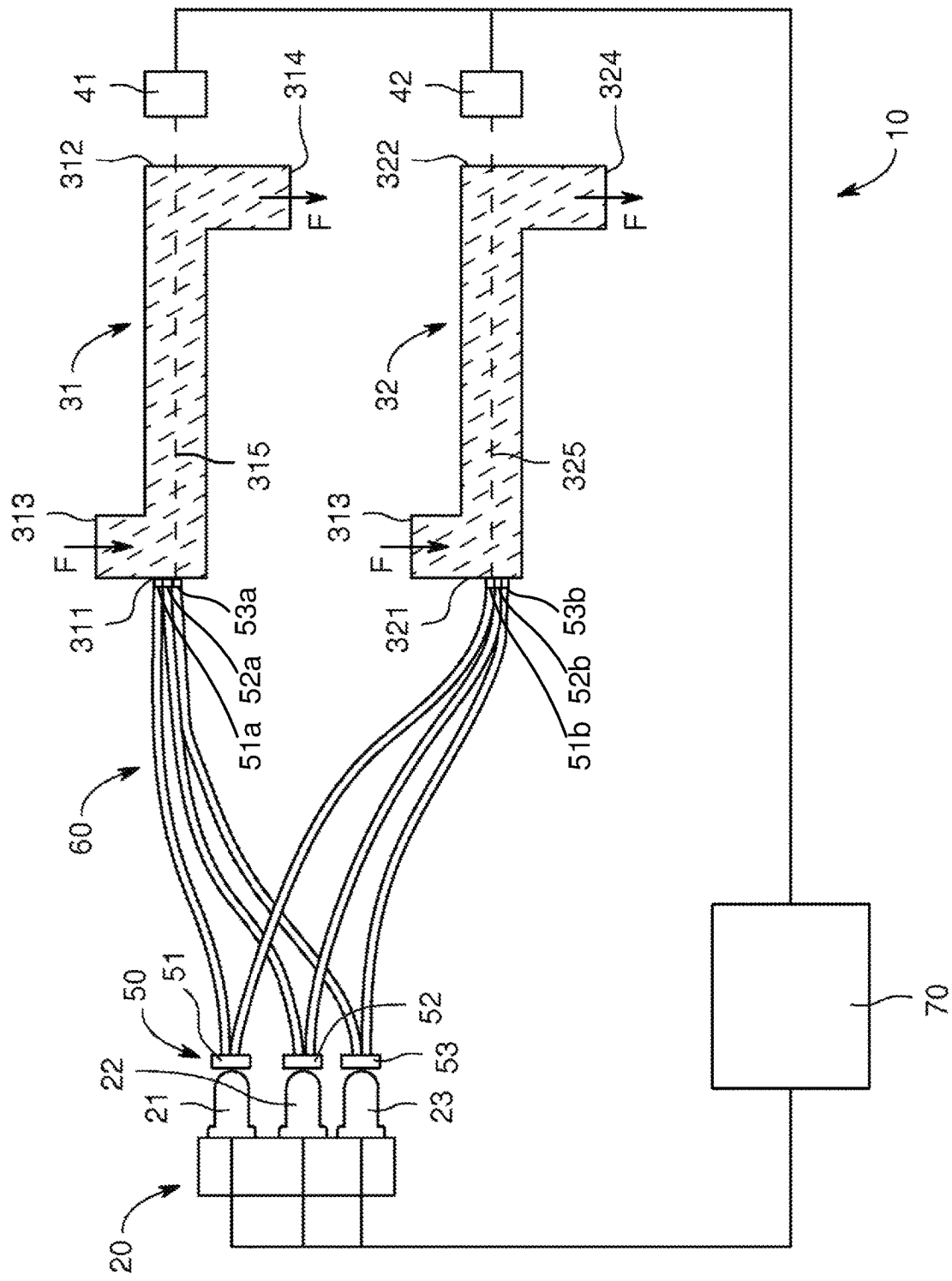

The invention will now be described in more detail with reference to the appended drawings, wherein:

FIG. 1 discloses a schematic view of a preferred embodiment of the invention;

FIG. 2 discloses a schematic view of another embodiment of the invention;

FIG. 3 discloses a schematic view of a further embodiment of the invention; and

Figure 4:
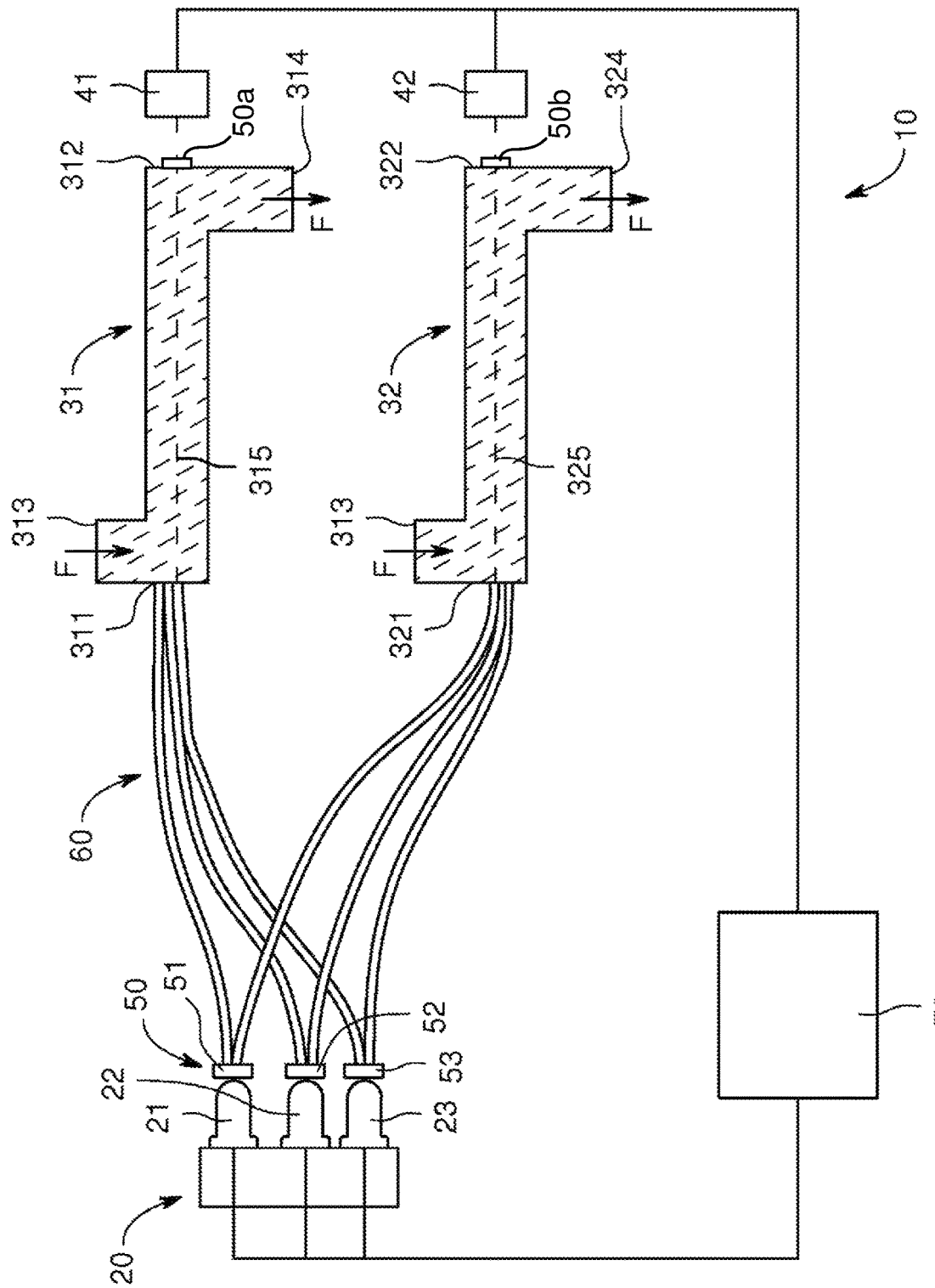

FIG. 4 discloses a schematic view of yet another embodiment of the invention.

DETAILED DESCRIPTION

FIG. 1 is a schematic representation of one embodiment of an apparatus according to the invention. The apparatus 10 comprises an LED light source arrangement 20 of light emitting diodes 21, 22, 23 which each emit light in the ultraviolet part of the spectrum (UV LED) and two flow cells 31, 32, each having an inlet 313, 323 and an outlet 314, 324 through which a solution containing a substance can pass in a flow F. It is to be noted that in some applications, the light may have wavelengths outside the UV spectrum, such as visible light for instance, and that what is said herein with reference to light within the UV spectrum also applies to such applications using other LEDs.

The flow cells 31, 32 also comprise light passages 315, 325 with light inlets 311, 321 and light outlets 312, 322 through which light from the LED light source arrangement 20 can pass and be received by photo-detectors 41, 42, which can either be UV sensitive photo multipliers or UV sensitive photo diodes. The apparatus further comprises band pass filters 50 which reject unwanted wavelengths and admits others, while maintaining a low coefficient of absorption for the UV wavelengths of interest. The bandwidth of the filter is a full width half maximum, and is preferably less than 10 nm, to give a good linearity and large dynamic range.

This preferred embodiment comprises three LEDs 21, 22, 23 in the LED light source arrangement 20, each being arranged to emit light of a specific wavelength within the spectrum that differs from the wavelengths of the other LEDs, and each being arranged with a corresponding optic filter 51, 52, 53 that is configured to allow that specific wavelength to pass while preventing other light from penetrating the filter. Adjacent to each LED 21, 22, 23 of the light source arrangement 20 are optical fiber bundles 60 having plural optical fibers that are arranged side by side to receive light that has passed through the filter 51, 52, 53 and providing a guiding light from a respective LED to each of the light passages 315, 325. The optical fiber bundles 60 are arranged so that one optical fiber from each LED 21, 22, 23 is connected to each light passage 315, 325 so that in this embodiment each of the three LEDs 21, 22, 23 emits light to two optical fibers 60. In other embodiments the number of LEDs may vary as can the number of light passages, and it is to be understood that what is described herein with reference to this preferred embodiment can easily be adapted to suit such differences in configuration. Alternatively, the optical filters 50 may be placed as filters 51*a*, 52*a*, 53*a*, 51*b*, 52*b*, and 53*b* at the light inlets 311, 321, as shown in FIG. 3, or as filters 50*a* and 50*b* between exits of light passages 315, 325 and detectors 41 and 42, as shown in FIG. 4.

The filters 51, 52, 53 at the LED light source arrangement 20 may be arranged on a wheel or similar structure to allow for a change of the filters as desired. Alternatively, filters that allow a plurality of wavelength bands to pass may be used so that a single filter may allow light from all the LEDs 21, 22, 23 to pass.

The flow cells 31, 32 have windows forming the light inlets 311, 321 which are made from a UV transparent material such as sapphire, quartz or synthetic fused silica and is of a known path length. Other materials, such as polymers could be used. The solution is passed through the flow cells 31 and 32 via the inlets 313, 323 and the outlets 314, 324, in the direction of arrows F, and may contain a substance with a light absorption at 300 nm or less e.g. a protein or nucleic acid. UV light from the LED arrangement 20 is used to irradiate the solution S in the flow cells 31, 32, the light entering the flow cells 31, 32 through the UV transparent windows 311, 321, as indicated by the dotted lines. Light passing through the solution and exiting the windows 312, 322 is then detected by the photodetectors 41, 42. The light propagating from the light passages through the flow cells 31, 32 is detected and quantified to determine the absorbance of the substance in the solution in the flow cell, as is well known within the art.

Similar to the embodiments disclosed by FIG. 2 and described below, the light inlets 311, 321 and/or light outlets 314, 324 may comprise optical fibers, glass rods or similar to allow the light to enter and exit the flow cells 31, 32, and to determine the path length of the light passages.

A controller 70 is connected to the LED light source arrangement 20 to control the operation of the apparatus by selecting which of the LEDs 21, 22, 23 is to emit light to irradiate the solution in the flow cells 31, 32. The selection can be made by switching only one of the LEDs 21 on or by blocking the others 22, 23 to prevent their light from reaching the flow cells 31, 32. Alternatively, the LEDs 21, 22, 23 may be allowed to emit light simultaneously but at different frequencies. The controller 70 is also connected to the detectors 41, 42 and able to receive signals corresponding to a quantification of light that has passed through the light passages 315, 325 without being absorbed by the solution. These signals may be analyzed and stored by the controller 70 or may be transmitted to a separate unit (not shown) for further analyses, storage and display. The controller may also be configured to control the flow of solution in the flow cells 31, 32, or alternatively that control may be performed by the separate unit.

Once the absorption of the solution is measured, the concentration of the substance in the solution can then be determined by use of the Beer Lambert Law where the molar absorptivity E of the substance is already known. This can be done manually or using a computer or the controller 70 provided. Alternatively, the concentration of the substance can be determined by use of a dose-response curve which has previously been produced for the substance of interest at a given wavelength e.g. 280 nm, or multiple response curves which are generated at different wavelengths can be used. Such determinations are made using a computer via a data link to the controller 70. In some applications, it is the change in absorbance that is of interest, for example during separation of proteins in a chromatographic column, and so there is no need to determine the concentration of the substance. In that case, the molar absorptivity (E) need not be known. Using two frequencies of light also allows this change in absorbance to be more closely monitored when the absorbance reaches a threshold where switching to a second less absorbed light can give a better resolution of the rate of change of absorption, and consequently the approach of a maximum or minimum of concentration values.

In this embodiment, the flow F through the flow cells 31, 32 can be in parallel or in series, but in either case the flow can be sequentially or synchronously monitored using different UV frequencies to provide a greater range of absorbance values as the concentration of the substance in solution changes. In a modification the two flow cells may have different light path dimensions, thereby further enhancing the range of the apparatus. For example where a substance has a low absorbance at a first frequency, then a long light path can be used, and where the same substance has a high absorbance at a second frequency, then a short path length can be used.

FIG. 2 discloses an alternative embodiment using a dual flow cell 30 with two light passages 305, 305' of different path lengths. The LED light source arrangement 20 has only two LEDs 21, 22, each emitting light that passes through optical filters 51, 52 and is transmitted through optical fibers 60 in order to reach the flow cell 30. To provide the different path lengths, glass rods 80 are provided and inserted into the flow cell 30 to create a first and second light passage 305, 305' where the first light passage 305 has a significantly smaller path length than the second path length 305'. In other respects, the embodiment of FIG. 2 corresponds to the preferred embodiment disclosed above, and it is to be noted that features of these two embodiments may freely be combined.

The apparatus according to the invention may be made more cost effective than previously known devices, using fewer components and requiring less space than other known devices.

The LEDs of the light source arrangement 20 and their corresponding optical filters 50 may be replaceable to allow for the substitution of LEDs with light output of different wavelengths. This has the advantage of increasing the number of substances whose absorbance can be measured by the apparatus and.

In operation, each the embodiments rely on a controller 70 to control the moment when the sample is irradiated. Since it is a straight forward task to alter the point in time at which the respective UV LED provides light to the sample cell, and the apparatus employed is rugged and low cost, then the embodiments shown provide an adaptable, reliable and low cost liquid device for determining the concentration of a substance in a liquid by measuring its absorbance. It is preferred that UV LEDs emitting light up to 400 nm are used for the measurement of concentrations in solution of proteins, peptides, nucleic acids, cell extracts, cell lysates, cell cultures or combinations thereof, but the invention has application to other light wavelengths, particularly wavelengths up to 700 nm. Two or three LEDs have been shown, but more than three may be employed, for example four, or five or six or more LEDs could be used, and additional LED's could emit visible light. In the embodiments, the band pass filters have been shown to be located between the sample cells 30, 31, 32 their respective LED light sources, however, the apparatus shown will function with equal effectiveness if the filters are placed after the sample cells, but before the detectors 41, 42. In that case, the filters will need to be changed so that the correct filter is used with the correct LED.

The LEDs shown are schematically represented, and their form could be different to that shown. So called multiple light source LEDs, which generate different frequencies of light from adjacent semiconductor areas could be employed, in which case the scale of the devices shown would be smaller, but there operating principles would be the same.

One mode of operation for all embodiments is to search for low concentrations of that substance at a first wavelength which substance even at low concentrations absorbs that light at the first frequency readily, and then, as concentrations increase, to switch to a second wavelength which is not so readily absorbed, thereby providing a greater range of operation and sensitivity. In another mode of operation, LEDs can be powered in a predetermined cycle, and the output for the detector is recorded in a matching cycle such that the light intensity from each LED is recorded according to the cycle. Thereby, the output resulting from each LED can be determined because it is distinguished by a distinct set of values in a memory, corresponding to the cycle. Cycling to differentiate between different LED's could be performed in time or frequency domain. The cycle can be made very short in time, for example fractions of a second (multiple Hertz), such that it appears to the eye that the LEDs are illuminated simultaneously. The detector's supporting electronics circuit can be arranged to inhibit or remove spurious signals, for example by detecting output only during a predetermined period within the switching cycle, to thereby remove noise from the signal which might occur during the initial illumination or at the end of illumination, for a respective LED.

The apparatus and method according to the invention may also comprise a reference detector arranged to receive a portion of light from the LED to provide a reference signal for comparison with the signals from the detectors. The light may be guided to the reference detector by means of an optical fiber or may be guided in other suitable ways, and additional components such as beam splitters may be used to divide the light into portions. In particular, where plural light guides are used to propagate light to a flow cell, for example, different light guides for different wavelengths of light from different sources, then it is envisaged that a single reference detector, or a detector array could be used to receive light from each of the sources, the light guides coming together at the detector or at the detector array. An exemplary depiction of a light detector or detector array 45 in connection with LEDs 21, 22, and 23 via discrete optical fibers is shown in FIG. 1. In practice, it would be possible to route one of plural optical fibers from each light source to each flow cell used, and another of the optical fibers to a reference detector, or to a detector array where multiple fibers are used, to provide a reference value for each light source during its use. What is important is the difference in light intensity measured by comparing the reference detector intensity and the flow cell detector intensity rather than an any absolute valve of intensity, so the length of optical fiber used in the reference path is not overly important, however for good practice about equal fiber lengths for the light guides used in the flow cell light paths and the reference detector light paths are preferred.

The above examples illustrate specific aspects of the present invention and are not intended to limit the scope thereof in any respect and should not be so construed. Those skilled in the art having the benefit of the teachings of the present invention as set forth above, can effect numerous modifications thereto. These modifications are to be construed as being encompassed within the scope of the present invention as set forth in the appended claims. For determining the scope of this disclosure, it is intended that any feature of one embodiment could be combined with a further feature or features of one or more other embodiments.

The invention claimed is:

1. An apparatus for measuring the light absorbance of a substance in a solution, comprising:
   at least one sample cell arranged to contain said solution that is at least partially transparent to light of a predefined wavelength spectrum;
   at least two separated light passages through each sample cell of said at least one sample cell, each of said separated light passages having a known path length and corresponding to one of the at least two LEDs, and wherein each of the at least two separated light passages define at least two separated optical paths within the sample cell, and
   an LED light source arrangement comprising at least two LEDs, each arranged to emit a light output with a wavelength different to the other LED or LEDs within said predefined wavelength spectrum,
   wherein each of the at least two LEDs includes an associated optical fiber bundle, each bundle comprising plural optical fibers, each bundle providing a light guide from a respective LED to each of the separated light passages, the apparatus further comprising a reference detector or detector array and wherein each optical fiber bundle includes at least one discrete optical fiber for providing a light path to said reference detector or detector array.

2. The apparatus according to claim 1, further comprising a controller arranged to control the light output from the LED light source arrangement.

3. The apparatus according to claim 1, wherein said at least one sample cell is a dual path length flow cell comprising said at least two separated light passages, and wherein each of said separated light passages has a path length differing from each of the other separated light passages.

4. The apparatus according to claim 1, comprising at least two sample cells, each having at least two light passages.

5. The apparatus according to claim 1, wherein the LED light source arrangement further comprises at least one optical filter for each LED, said optical filter being arranged between the LED and the optical fiber bundle.

6. The apparatus according to claim 1, further comprising at least two optical filters for each LED of the LED light source arrangement, said optical filters being arranged between an output end of each optical fiber and an entrance of a corresponding light passage.

7. The apparatus according to claim 1, further comprising at least two optical filters for each LED of the LED light source arrangement, said optical filters being arranged between an exit of each light passage and a corresponding detector.

8. The apparatus according to claim 1, wherein at least one of the LEDs is arranged to be replaceable.

9. The apparatus according to claim 1, wherein the light guides come together at the reference detector or at the detector array.

10. The apparatus according to claim 1, wherein substantially equal fiber lengths are used for the light guides used in the flow cell light paths and the reference detector light paths.

11. The apparatus according to claim 1, further comprises at least two separated photo-detectors, each of the at least two separated photo-detectors associated with a different one of the at least two separated light passages.

12. The apparatus according to claim 1, wherein the at least two separated optical paths are positioned through different portions of the sample cell.

13. A method for measuring the light absorbance of a substance in a solution, comprising:
providing an LED light source arrangement with at least two LEDs, each arranged to emit a light output with a wavelength different to the other LED or LEDs within a predefined wavelength spectrum;
providing for each LED an associated fiber bundle, each bundle comprising plural optical fibers, each bundle providing a light guide from a respective LED to each of at least two separated light passages within a sample cell arranged to contain said solution through the substance in solution, wherein each of the at least two separated light passages define at least two separated optical paths within the sample cell;
providing a reference detector or detector array, wherein each fiber bundle includes a discrete optical fiber for providing a light path to said reference detector or detector array; and
quantifying the light propagating from the solution at each of said separated light passages to provide an indication of the absorbance of the substance in the solution.

14. The method according to claim 13, further comprising controlling the LED light source arrangement to select one of the LEDs for providing said light output.

15. The method according to claim 13, further comprising transmitting the light output from each LED through an optical filter arranged between the LED and the optical fiber or between the optical fiber and the light passage.

16. The method according to claim 13, wherein the at least two LEDs are caused to emit light in a predetermined cycle and the quantifying step includes recording the intensity of light propagating from the solution at each light passage at intervals corresponding to the cycle.

17. The method according to claim 13, wherein the step of providing an optical fiber bundle includes routing one or more of the optical fibers to the respective reference detector or detector array, and the step of quantifying the light propagating from the solution, includes comparing the light intensity propagating from the solution with the light intensity at a respective reference detector or detector array.

* * * * *